US00RE38899E

(19) United States
(12) Reissued Patent
Fischer

(10) Patent Number: US RE38,899 E
(45) Date of Reissued Patent: Nov. 29, 2005

(54) METHOD FOR PROVIDING LOCATION CERTIFICATES

(76) Inventor: Addison M. Fischer, P.O. Box 9107, Naples, FL (US) 33942

(21) Appl. No.: 09/377,724

(22) Filed: Aug. 19, 1999

Related U.S. Patent Documents

Reissue of:
(64) Patent No.: 5,659,617
Issued: Aug. 19, 1997
Appl. No.: 08/310,022
Filed: Sep. 22, 1994

(51) Int. Cl.[7] ..... H04K 1/00
(52) U.S. Cl. ..... 380/258; 713/156; 380/270; 342/357.12; 342/357.14; 342/357.15
(58) Field of Search ..... 380/258, 270; 713/156; 342/357.07, 357.09, 357.13, 357.17, 357.12, 357.15, 270

(56) References Cited

U.S. PATENT DOCUMENTS 3,774,215 A * 11/1973 Reed ..... 343/100
4,077,005 A * 2/1978 Bishop
4,707,699 A * 11/1987 Toellner et al.
4,819,053 A * 4/1989 Halavais ..... 342/357
4,860,352 A * 8/1989 Laurance et al.
4,972,431 A * 11/1990 Keegan
4,993,067 A * 2/1991 Leopold
5,101,208 A * 3/1992 Parker et al.
5,155,490 A * 10/1992 Spradley, Jr. et al.
5,221,925 A * 6/1993 Cross
5,243,652 A * 9/1993 Teare et al. ..... 380/21
5,434,789 A * 7/1995 Fraker et al.
5,459,473 A * 10/1995 Dempster et al.
5,499,294 A * 3/1996 Friedman
5,568,119 A * 10/1996 Schipper et al. ..... 340/825
5,577,122 A * 11/1996 Schipper

OTHER PUBLICATIONS

Simmons, Contemporary Cryptography, IEEE Press, pp. 221–222, 1992.*
Simmons, Contemporary Cryptology, the Science of information integrity, IEEE Press1992, p. 182, 185–187, 193–194, 197–199.*

* cited by examiner

*Primary Examiner*—Ayaz Sheikh
*Assistant Examiner*—James Seal
(74) *Attorney, Agent, or Firm*—Nixon & Vanderhye P.C.

(57) ABSTRACT

Methods and apparatus for providing location certificates to certify the position or location of an object are disclosed. The position of the object is computed using radio signals and the secure transmission of the computed position is achieved using public key encryption techniques.

35 Claims, 3 Drawing Sheets

$$B_3 = B_1 - V_1 + B_0 - V_3$$

METHOD FOR PROVIDING LOCATION CERTIFICATES

Matter enclosed in heavy brackets [ ] appears in the original patent but forms no part of this reissue specification; matter printed in italics indicates the additions made by reissue.

FIELD OF THE INVENTION

The invention relates to methods and apparatus for providing reliable location certificates which are used to prove the geographic location of a particular object or event. More particularly, the invention relates to establishing to a requestor that an object is being used in its restricted area of use, that an object being tracked is in a particular geographical location, or that an event is confined to a particular area.

BACKGROUND AND SUMMARY OF THE INVENTION

It is frequently desirable or imperative to reliably know the precise location of an object, and to be able to determine that location on a reoccurring basis. The object may be highly mobile or relegated to use in a confined area or confined areas.

Objects being transported by vehicle are highly mobile. With respect to such objects which are dangerous or controlled, as for example toxic waste and nuclear materials, it is desirable to be able to reliably monitor their location during transport between locations. Such monitoring may be continuous or may be from point-to-point.

Digital signatures represent objects which may be intended to be used only in Highly localized areas. Digital signatures involve the use of cryptographic keys to sign messages. For legal or security reasons it is at times important to prove or establish that these digital signatures are being generated within a particular jurisdiction, a specific complex, building or room. For example, a digital signature of a bank employee that is used in various bank transactions would advantageously be confined to the location of a guarded bank facility. An employee's computer sign-on token may be limited to use at a specified location such as home or the office. For audit and billing purposes the location of requestors for access to sensitive material or databases is needed.

There are other environments in which it is important to reliably know the location of an object. A supplier of electronic broadcasts may need to screen certain locales to black-out reception of certain sports broadcasts, concerts, etc., or other signals such as electronic gambling events. In other instances, satellite decoder boxes limited to use in licensed areas are needed.

The present invention uses unique location certificates to track goods and wares during shipment, establish the location of participants in a network, determine the location at which a digital signature was performed, ascertain the validity of objects which are expected or mandated to be present within certain geographic bounds and control the use of security or sensitive devices by limiting their operation to certain locations.

Determining the location of an object or event involves the employment of a position determination unit. In accordance with an exemplary embodiment of the present invention, the position determination unit operates on the reception of Loran or Global Positioning System (GPS) signals to establish its location. The unit may continuously determine its position or compute its position on request. A secure authorization unit functions to authenticate the location information reported to a requestor. Specifically, the secure authorization unit, through the use of its private digital signature key and a certificate authenticates that the requested position information is provided by a trusted location certification unit.

Three basic systems are set forth as exemplary embodiments of the present invention, one with a basic location certification unit (LCU), a second using a sensor, and a third operating on a two-way communication link between beacons and a sensor in the LCU. In addition, many variations and modifications of these systems are disclosed, and others would be readily apparent to those skilled in this art. In these systems, there is the ever present danger of attempts by unauthorized individuals to breach the security of the system, as for example, by the use of sophisticated spoofing techniques where false radio broadcasts on Loran or GPS frequencies may be employed to cause the position determination unit to compute a position other than its actual position. The systems of the present invention use techniques and procedures to safeguard against such eventualities.

DETAILED DESCRIPTION OF THE INVENTION

In public key encryption systems, the public keys of a user are the encryption keys published by the user that may be used for privately communicating with the user. Anyone wanting to privately communicate with the user simply encrypts the message employing the users public encryption key. Only that user's secret decryption key can be used to decipher the encrypted message.

In order to ensure that a specified public key is one that has actually been created by the specified individual, certificates are provided. Certificates can be thought of as brief messages which are signed by the trusted authority, and which contain, either explicitly or implicitly, a reference to the public key which is being therein certified, and the identity of the public key's owner. In such an implementation, if "C" has provided a certificate for "A"; then recipient "B" can trust the use of "A's" public key, provided that "B" trusts "C".

Figure 1:
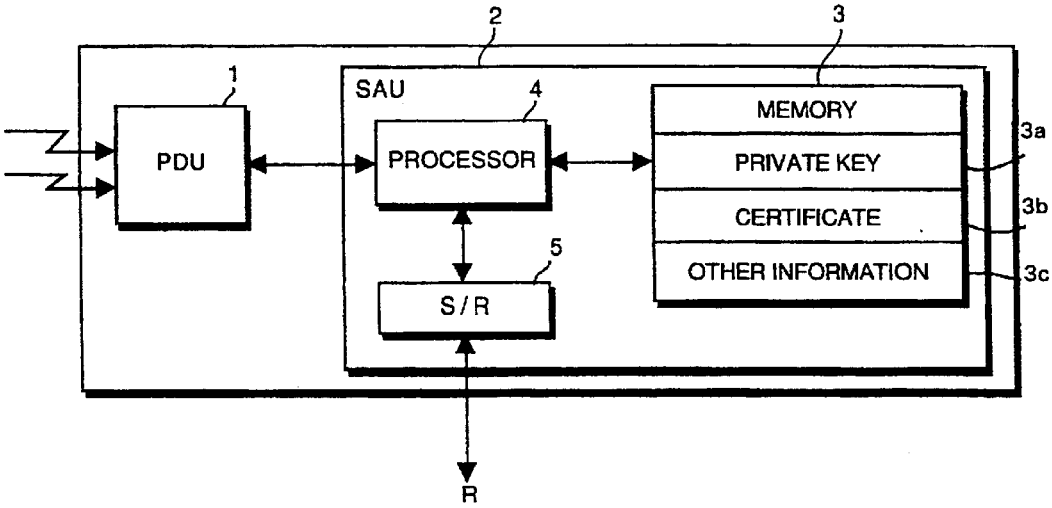
FIG. 1 shows a first illustrative embodiment of a location certification unit.
Figure 2:
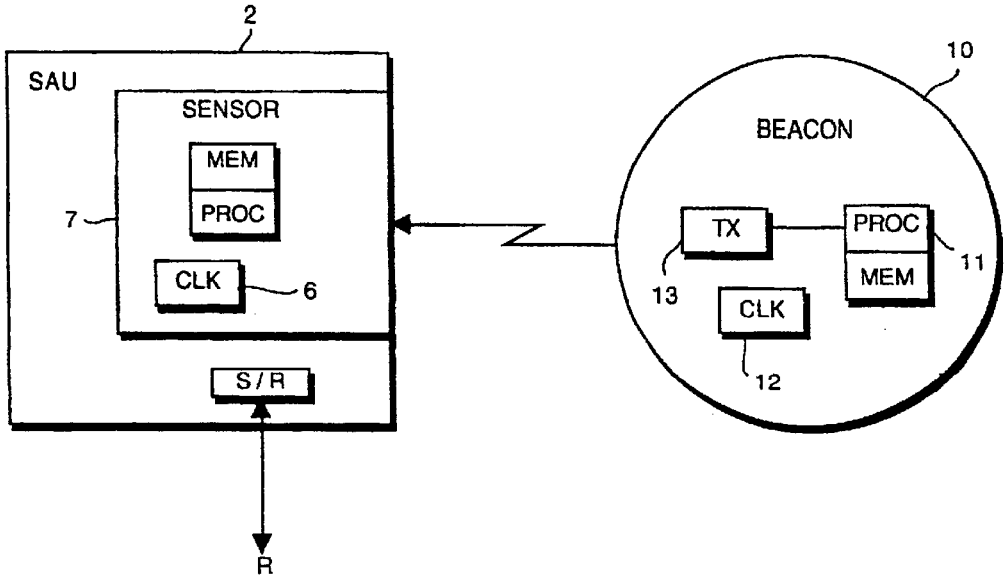
FIG. 2 shows another illustrative embodiment with a mobile object.

A location certification unit (LCU) as shown if FIG. 1 includes a position determination unit (PDU) I coupled to a secure authorization unit (SAU) 2. The units 1 and 2, or at least the sensitive components of the units, are contained in a tamper resistant enclosure in such a manner that tampering will trigger an alert signal and erasure of sensitive information such as authenticating keys stored in the unit. Acceleration fuses can be used to prevent tampering through subjecting the unit to acceleration or gravitational forces to disturb a clock, if included in the unit. As will be appreciated by those skilled in the art, the nature and degree of security and tamper resistant expedients incorporated into the system and components will correspond to the anticipated risks.

The PDU 1 includes conventional position determining apparatus for receiving Loran and/or GPS signals and for computing its position. The current location or position may be continuously computed and maintained, or it may be computed only in response to a request.

SAU 2 contains its own private digital signature key stored in a secure probe-resistant memory 3. This private key has a public aspect which is digitally signed by the manufacturer, using its well guarded private key, thus providing a certificate indicating to the requestor that the public key used to communicate with the SAU belongs to a trusted LCU. This certificate may be presented to the requestor R as a part of the location certificate. The SAU includes a processor 4 for processing data and control of internal functions, and a send/receive unit 5 for communicating with the requestor R.

While the invention is not limited to any particular digital signature key technique, one technique which can be used is the RSA technique of using a private digital signature key to sign a message which the requestor or receiving party can validate using the originator's public key, as described in U.S. Pat. No. 4,405,829 issued to Rivest et al. In brief, an intended receiver's public key is made available to the sender, i.e., requestor, and is used for sending an encrypted message. Only the private decryption key at the LCU's receiver can decipher the message. The decryption key is then used to digitally sign a message which is sent to the original sender or requestor. The recipient or requestor can verify the signature by encrypting it with the LCU's public key. While anyone having the LCU's public key can read the signature, only the LCU signing the message could have created it.

The certification is provided by the manufacturer's digital signature which may be stored in memory at the SAU and sent to the requestor. That is, the manufacture provides a digital signature indicating that the public key, used by the requestor, belongs to a trusted LCU, as described, for example, in U.S. Pat. No. 5,214,702 issued to the inventor (which is hereby incorporated by reference). This certificate presented to the requestor serves as a part of the authenticated location certificate.

In operation, the LCU (FIG. 1) in response to a request computes or determines its current position in the PDU 1, authenticates the reported position by supplying a digital signature 3a and a certificate 3b in the SAU 2, and sends the message to the requestor R. Additional information 3c may be provided in the signed message, as for example, the current time/date stamp, the identity of an associate user, and the challenge response information supplied by another entity, e.g., requestor.

Verification of the digitally signed message is effected by use of the trusted manufacturer's public key. The manufacturer's public key is used by the requestor to determine that a unit's public key is, in fact, in a certification hierarchy and is associated with a trusted LCU. This validation of the unit's public key is then used to verify the digital signature. Any alteration of the digital signature is immediately detected. Where multiple levels of certification are used, as in inventor's U.S. Pat. No. 5,005,002 (which is hereby incorporated by reference), the trusted key is used to chain through the certification hierarchy to ultimately determine that the unit's public key is, in fact, associated with a trusted LCU.

Installing LCUs in objects, e.g., digital signing devices, computer log-on cards, controls for broadcast receivers, or smart cards for use with broadcast receivers, in combination with means for disabling the use of such objects, provides for control over the location at which the objects can be used. Incorporating a LCU in a computer log-on card designed to be limited to use at either the office or home, means that the defeat of the LCU would require sophisticated techniques such as generating false Loran or GPS signals to cause the PDU of the LCU to compute a false position. Moreover, the presence of other conventional safeguards such as personal identification number (PIN) or password requirements to activate the card would provide significant layers of protection against the ordinary thief successfully using the card.

A second embodiment of a LCU is particularly useful for monitoring the location of a moving object. Illustrated in F1G. 2, the LCU is incorporated in a system having features which make the location certificate spoof resistant, i.e., resistant to being deceived into computing a false position. The use of a highly accurate clock 6 in the sensor 7 of the LCU synchronized with a clock 12 of the beacon 10 serves to defeat spoofing of the system. In this embodiment, each beacon 10 is equipped with a private key or a shared private key that is common among the beacons. Where beacons share a common key, then each beacon is provided with its own unique identification. The keys or identifications are maintained in a memory associated with processor 11. The LCU has one or more sensors 7 that have access to the beacons' public keys. A beacon's transmission includes digital authentication of the broadcast time and an indicator of the beacon's identity.

Under the foregoing conditions, and without the synchronized highly accurate clocks, a would-be spoofer, cannot substitute or cause a sensor to confuse one beacon's signal with that of another, nor accelerate or formulate signals. One can, however, copy a beacon's transmission and rebroadcast it at some delayed interval or intervals. The system then has need of means to prevent the reception or action on signals that are too distant or at wrong angular locations. This is the function of the synchronized clocks.

When beacons are in orbiting satellites as in the GPS or are in Loran stations, position is determined using two, three or more beacons. A delayed rebroadcast of a true satellite beacon's message from a false beacon would mean that the false beacon is located further out in space or on the other side of the Earth. In the latter case, sensing a different beacon lying in a direction away from the apparent position of the first observed beacons suffices to determine whether the computed position is true or false. In the former case, the aforementioned synchronized clocks are used to inhibit the reception and use of the false beacon.

With the synchronized clock system, each beacon precomputes the digital signature and its time duration that is due to be transmitted at some precise time in the future. At the prescribed moment, the first bit of the precomputed digital signature is transmitted. The balance of the message, including an authenticated time stamp, is of predictable duration and is transmitted with each bit coming at a precisely timed interval. The sensor or receiver at the LCU determines, based on its internal clock, the exact moment the transmission was received, and that each bit after the first bit arrived on schedule. This need not be done in real time but the message may be stored and processed after it has been fully received. The authenticated time stamps are verified using the public key associated with each beacon and compared with the sensor clocked time of receipt of the message. An additional time check can be made by considering the differentials between beacons. The position of the LCU is determined by using the time differentials between each of the beacons, and the result is checked for consistency. The position computed by the differentials must agree with the time difference between the sensor's internal clock and that time broadcast by each of the beacons. The position of each beacon is known, from authenticated broadcasts or tables stored in the sensor, the speed of the transmitted radio signal is known, then the purported distance/time to each beacon can be calculated. The calculated times and the measured time differentials are compared to see that they are the same.

The degree of accuracy of the clocks sets the degree of accuracy to which true or false signals can be detected. Therefore, the clocks must have accurate time intervals and must not drift over long periods of time. Drift problems can be minimized by resetting the clocks periodically, recalibrating the sensor clocks from master clocks at the beacons, using temperature controlled clock environments, and using very high quality accurate clocks or a multiple clock system. Where the clocks are subject to strong gravitational fields or acceleration and run slower, the fact that the clock runs slower can be taken into consideration. Since the speed of light is one foot per nanosecond, the degree to which spoofing can be controlled is one mile per 5 microseconds of drift.

Figure 3:
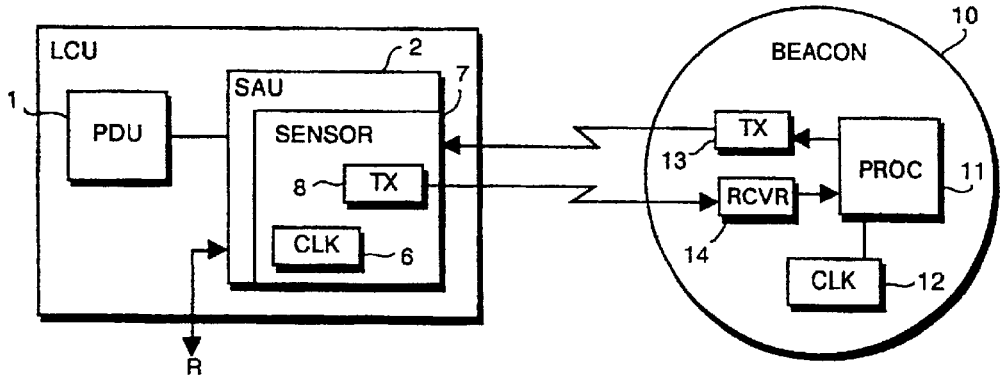
FIG. 3 shows a further illustrative embodiment operating with a two-way communication link between a beacon and a sensor at the LCU.

In a third embodiment, illustrated in FIG. 3, the sensor 7 relies on a beacon 10 with a confirmed position and the PDU 1 determines its position as a function of being on a radius of the beacon. As in the previous embodiment, each sensor has a clock 6 synchronized with the clock 12 of the beacon, and maximum position is determined by measuring the time required to receive the beacon's signal. The need for the high synchronization of the previous embodiment is reduced by using a two way communication path between a beacon and a sensor. Thus, the sensor 7 is provided with a transmitter 8 compatible for communicating with a receiver 14 in the beacon 10. In addition, the beacon is provided with a processor 11 for controlling the transmission and formulating a response.

The sensor generates a random challenge number and transmits it to the beacon. The beacon constructs a response, including its digital signature, the sensor's random challenge number and the beacon's position. The beacon's clock value and other beacon operating characteristics may also be included in the response.

Figure 4:
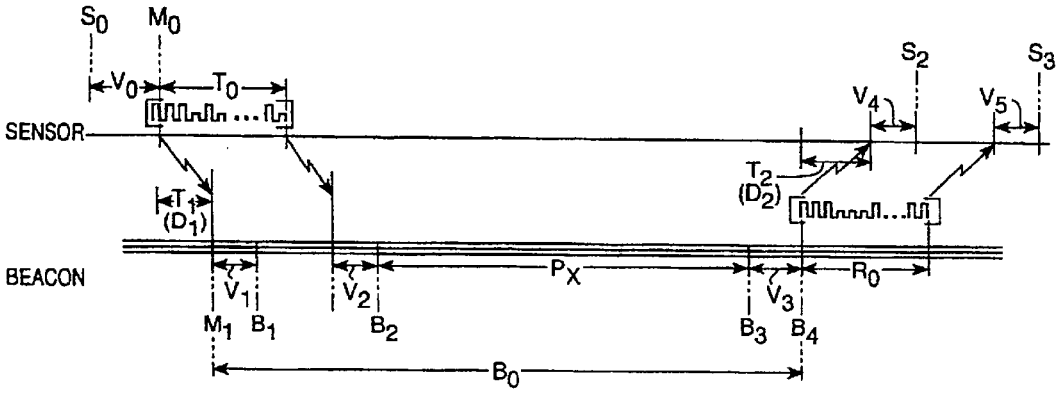
FIG. 4 illustrates the signal timing between and within units of the embodiment of FIG. 3.

As illustrated in FIG. 4, each signal exchanged by the sensor and the beacon has a mark pulse which is the signal to which the time of transmission is associated and calibrated. The mark pulse can be the first, the last or at any other distinguishable point in the transmission. The signal parts illustrated in FIG. 4 are identified as follows.

$S_O$—The observed value of the sensor's clock when the request is started.

$V_O$—The sensor emission time: the (known, previously calibrated) time interval between $S_O$ and the moment the mark pulse physically escapes from the sensor. This includes whatever processing time is required to read the clock, store the clock value, construct the request, etc.

$T_O$—The duration of the request signal.

$T_1$—The time for the request signal to move from sensor to beacon.

$D_1$—The distance which the request signal traverses.

$M_1$—The moment the request's mark pulse impinges on the beacon.

$V_1$—The beacon reaction time—the (known, calibrated) time required between $M_1$ and the moment the beacon's clock value is observed.

$B_1$—The beacon clock value determined after the mark pulse is determined.

$B_2$—The beacon clock value at the end of transmission receipt.

$V_2$—The beacon trailing reaction time (to determine the clock value after the transmission is recognized as complete).

$B_O$—The overall beacon "processing time"—from the time a request signal impinges on the beacon, to the moment the response signal escapes. In the preferred embodiment, this time is known before the signal is actually computed—it is actually taken as a "given" which the beacon works to provide.

$P_x$—The time required by the beacon to process the signal, perform the digital signature, prepare the response, and schedule it for transmission.

$B_3$—The internal clock time which the beacon must observe in order to commence response emission.

$V_3$—The (known, calibrated) time which is spent by the beacon after observing a trigger clock value (say B3) until the response's mark pulse actually escapes the beacon.

$B_4$—The moment the mark pulse escapes the beacon.

$T_2$—The time for the response signal to move from beacon to sensor.

$D_2$—The distance which the response signal traverses.

$V_4$—The (known, calibrated) sensor time reaction between the receipt of the response mark pulse, and the observation of the sensor's clock.

$S_2$—The sensor clock value observed after receiving the response mark pulse.

$V_5$—The (known, calibrated) sensor time reaction between the receipt of end of response, and the observation of the sensor's clock.

$S_3$—The sensor's clock value after recognizing the end of the response.

$R_O$—The expected duration of the response transmission.

Figure 5:
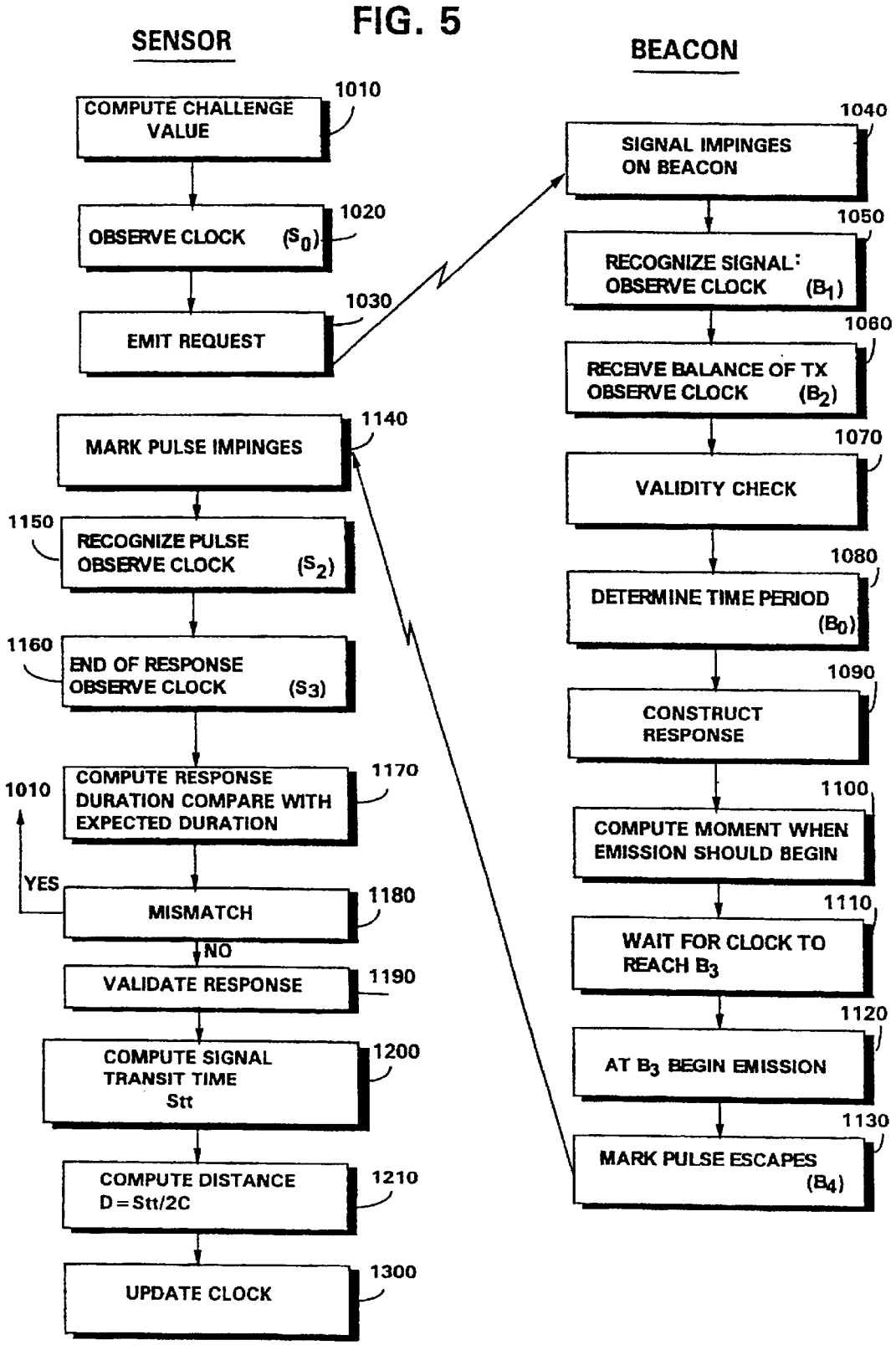
FIG. 5 is a flow chart delineating the sequence of operations performed in the FIG. 3 embodiment.

Given these variables, the timing, illustrated in FIG. 4, and the processing, illustrated in FIG. 5, are as follows:

1010 The sensor computes a challenge value, constructs the transmission request (of known length and duration $T_O$).

1020 The sensor observes its clock ($S_O$).

1030 The sensor emits the request. The calibrated time between step 1020 and the eventual emission of the mark pulse is a calibrated constant ($V_O$).

1040 The signal impinges on the beacon at $M_1$.

1050 After recognizing the signal, the beacon observes its clock value ($B_1$). The process requires known calibrated time ($V_1=B_1-M_1$).

1060 The beacon receives the balance of the transmission, and observes its clock value ($B_2$) at the end. Checks may also be done to all intermediate transmission pulses to see that they are properly timed.

1070 Validity checks are done. For example, the expected request transmission time ($T_O$) is checked against the observed time ($B_2-V_2-(B_1-V_1)$).

1080 The beacon is designated to emit its response after a predictable duration ($B_O$). Such duration must always exceed all possible expected intermediate computations and processing (preferably by some comfortable margin). $B_O$ can be constant, and characteristic of a class of beacons; or can be constant for each specific beacon; or can be determined as part of each response (and therefore must be included as information as part of the response). In any event, whether constant or variable, the beacon must know (or compute) it prior to constructing the response.

1090 The beacon constructs the response, consisting of, e.g., a. The sensor's received challenge value.
b. The beacon's Location.
c. An indication of the Authority which Confirms the the Location; possibly including a digital signature.

Other information, such as, e.g., d. Any clock value corresponding to a distinguishable beacon event. In the embodiment shown, this is $B_4$—the time the mark pulse is expected to escape. This is computed as:

$$B_4=B_1-V_1+B_O$$

e. The beacon's public key and certificate.
f. An indication of the beacon's certifying authority.
g. The beacon's identifier.
h. The beacon's processing time $B_O$.
i. The beacon clock's accuracy, granularity, etc.
j. The expected length of the response transmission.
k. When the location was set.
l. Other beacon characteristics.
m. Characteristics, or facts, about the Confirming Authority; including, for example, a digital signature.

The beacon then digitally signs at least transmission fields a, b, c using the beacon's private key.

1100 The beacon computes the moment $$B_3=B_1-V_1+B_O-V_3$$

when emission processing should commence for this response.

1110 If the beacon handles multiple signals in parallel, then the response is queued until time $B_3$; if the beacon handles requests serially, then the beacon simply waits until it observes clock value $B_3$.

1120 On observing clock value $B_3$, the beacon commences to emit the already computed response, with expected duration of $R_O$.

1130 The mark pulse associated with the response escapes the beacon at time $B_4$, since the calibrated emission processing time after observing time $B_3$ until mark pulse escape is known to be $V_3$.

1140 The mark pulse impinges the sensor.

1150 After recognizing the mark pulse, the sensor observes its clock and obtains reading $S_2$. The time required to do this has been calibrated as $V_4$.

The balance of the response is accepted and verified as arriving under the expected time and signal constraints.

1160 After receiving the end of the response, the sensor takes observed clock reading $S_3$, which is calibrated as requiring $V_5$ seconds to accomplish.

1170 The sensor then computes the response transmission duration $$(S_3-V_5)-(S_2-V_4)$$

and compares it with expected duration $R_O$.

1180 If there is a mismatch, a fault is indicated, and the location operation may be re-performed.

1190 The sensor validates the response:

Verifies the beacon's digital signature.
Verifies the beacon's public key (using, e.g., the beacon's certificate)
Insures it trusts the beacon or its certifier.
Identifies and insures it trusts the Confirming Authority.
Extracts the authenticated beacon position.

1200 Using information about the beacon, supplied by the beacon or elsewhere, the sensor computes the signal transmit time:

$$Sn=(S_2-V_4)-B_4+M_1-(S_O+V_O)=S_2-V_4-B_O-S_O-V_O$$

1210 Assuming the sensor was stationary during the signal exchange, and assuming the signal traveled at "c", the speed of light, then $$(stt/2)(c)$$

reasonably estimates the distance of the sensor from the beacon's known authenticated location. Even if the sensor moved during the exchange, the sensor must have been at least within this distance at some moment during the exchange. This estimate may need to be tempered using error estimates based on clock granularities, wavelengths used by the transmissions, and inherent clock error bounds.

1300 Based on this exchange, provided the beacon included its clock reading, say $B_4$ (see (d) in step 1090), the sensor is able to update its clock by an additive amount:

$$B_4+(stt/2)(c)-(S_2-V_4)$$

with an accuracy of:

plus-or-minus (stt/2)(c)
+inherent clock granularities & errors
+transmission signal frequency Where the first error term arises from the possibility that the sensor was moving toward or away from the beacon during the exchange. If the sensor is known to be fixed, such as using motion detectors to insure no movement occurs during the exchange, then the first error term can be omitted.

In the above example of this embodiment, the response includes the beacon's certificate in its transmission. However, the beacon's public key may be embedded in the sensor, or may be ascertained in other manners. Other authenticated digital information may include, the beacon's identity, expected response time, means by which the location information has been determined, the expected accuracy of the positional information, the authority responsible for determining the beacon's position, the level of security ascribed to the device, the time associated with the response mark signal, and the authority responsible for determining the beacon's clock.

In this embodiment, the precise position of the beacon is a limiting factor on the correctness of determined position of the PDU. The position of the beacon can be determined by Loran, GPS or other radio based techniques, and it can be confirmed by a trusted calibrating authority. To insure that the beacon remains stationary once its position is established, movement sensors may be provided to generate an alert signal upon the sensing of movement or tampering. Where such a stationary beacon is moved for any reason, deliberately or by an earthquake, then the position must be redetermined and reconfirmed.

Where the beacon's position is confirmed by a calibrating authority, then the authority is responsible for certifying the accuracy of the position information. If the beacon determines it own position from radio signals, then the calibrating authority can only be viewed as a confirming entity that the beacon is a trusted beacon, and not one that may have been spoofed. Hence, certificates by calibrating authorities are constructed and appraised in accordance with the function of the calibrating authority, which may be indicated in the certificate. Moreover, identification of the calibrating authority in the certificate serve to inform the user of same the degree to which position information may be trustworthy.

A stationary beacon may advantageously be used as a source to set a highly accurate clock in mobile LCUs. As in the example above, where the beacon includes its clock value $B_4$ as part of its response, then the mobile LCU can set its clock to a trusted accuracy with known error. With [reject] *respect* to high acceleration of the LCUs, an acceleration fuse would provide a part of the tamper resistant construction.

While the digital signature has been described using the RSA algorithm, other algorithms such as DSA, symmetric, or the protocols developed by Goldwasser and Micali or by Chaum may be employed. Moreover, the algorithms and/or protocols may be used in combination.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A secure method of establishing the location of an object by calculating in-situ the location of the object from received radio signals wherein the radio signals are received from a beacon via a two-way communication between the beacon and a sensor on the object, comprising computing and transmitting at said sensor a signal including a challenge value and observing a clock associated with said sensor, recognizing at said beacon the transmitted sensor signal, observing at the beacon a clock associated with the beacon, constructing a response message including the sensor's received challenge value, the beacon's location, its location certificate and a time stamp, and transmitting the response message to said sensor, recognizing at said sensor said transmitted response message, observing the sensor clock, and validating the response message, computing the signal transit time and estimating the distance to the beacon, and based on the location of the beacon and the distance, calculating the location of the sensor and thereby the location of the object, and transmitting in response to a request from a requestor a message comprising the digitally signed calculated location of the object.

2. A method as in claim 1 and including transmitting a certificate for the object in the message comprising the digitally signed calculated location of the object.

3. A method as in claim 1 wherein the clocks associated with the beacon and the sensor are synchronized and including, calculating the transit time from the time stamp and the observed time for receipt of the response message at the sensor and comparing this time with the computed signal transit time.

4. A method as in claim 1 wherein said object includes a sensor with a accurate clock synchronized with a beacon clock and includes the step of receiving a time stamp from the beacon and comparing it with the sensor clock to authenticate the receipt of location information is from a valid beacon.

5. A method as in claim 1 wherein said beacon and said sensor each include an accurate clock and includes the step of updating the sensor clock in accordance with the time stamp transmitted by the beacon.

6. Apparatus for providing location certificates comprising a location certification unit for receiving radio signals from two or more beacons, said location [certificate] *certification* unit including position determination means and secure authorization means, said secure authorization means including a private key of a private key-public key pair for digitally signing messages sent to a requesting source, a certificate for the public key certifying that the public key is in fact the public key of the secure authorization means, a clock synchronized with clocks in the beacons, means for receiving and processing a time stamp transmitted by a beacon, and means for determining from the time stamp and the clock in the secure authorization means that a received radio signal is from a valid beacon, said beacons providing radio signals from which said position determination means can compute its position and said secure authorization means can determine that the signals are valid, and means for sending to said requesting source upon request a digitally signed message including the computed position of said location certificate unit and the certificate for the public key which public key is to be used by the requesting source to verify the signed message.

7. Apparatus as in claim 6 further comprising means for establishing a secure two-way communication link between each beacon and the sensor in the secure authorization means.

8. Apparatus as in claim 6 wherein said location certification unit is a component of a digital signature device.

9. Apparatus as in claim 6 wherein said location certification unit is a component of a satellite signal box.

10. A location certification unit comprising a position determination unit, a secure authorization unit coupled to said position determination unit, a memory within said secure authorization unit, a digital signature key stored in the form of digital data in said memory, said key having an associated public key, a certificate for said public key, said certificate being stored in said memory, a sensor for receiving a message from a beacon that includes the clock time at which the message was transmitted and for processing the message to retrieve the clock time, the sensor including a clock, said position determination unit computing from the retrieved clock time and the time of sensing a received message as indicated by the sensor clock the radial distance the location certification unit is from the beacon thereby determining the location of the location certification unit as being within a geographical area centered on the beacon, and means for communicating to a requestor in response to a request the certified location of said location unit, said certified location comprising the location as determined by said position determining unit signed with said digital signature key and the certificate for said public key.

11. A location certification unit as in claim 10 wherein said memory further stores a personal identification number and a password and said location certification unit is a component of a computer log-on card.

12. A location certification unit as in claim 10 wherein the location certification unit is a component of a digital signature device.

13. A location certification unit as in claim 10 wherein the location certification unit is a component of a satellite signal decoder box.

14. A location certification unit as in claim 10 wherein the message from a beacon includes the digital signature of the clock time at which the message was transmitted, and said sensor has stored therein the public key of the beacon for verifying the clock time using the public key of the beacon.

15. A location certification unit comprising;

a position determination unit for determining the position of the location certification unit from received radio signals, a secure authorization unit coupled to the position determination unit and comprising a memory, a sensor having a clock for providing clock time, and means for communicating to a requestor in response to a request a message containing the certified position of the location certification unit as determined by the position determination unit, said memory having stored therein a digital signature key and a certificate for a public key associated with the digital signature key, said clock providing a clock time for validating a received radio signal, the signal containing the time at which it was transmitted, sensed by the sensor as being from a valid source, and said certified position of the location certification unit comprising (1) the position of the location certification unit as determined by the position determination unit signed using the digital signature key and (2) the certificate.

16. A location certification unit as in claim 15, said sensor further comprising a processor for processing sensed radio signals to provide the identity of the source of the signal where that information is contained in the signal, and for decrypting a sensed digitally signed radio signal with the public key of the source of the signal to verify the identity of the source and the time at which the signal was transmitted.

17. A location certification unit as in claim 15 wherein time differentials between the time the sensor clock marks a sensed signal and the time at which the signal was sent with respect to a plurality of sources are used to calculate the position of the location certification unit and each time differential is checked with the calculated signal transit time from the calculated position to the known location of the source.

18. A location certification unit as in claim 15 wherein said sensor is capable of receiving and processing signals received from more than one source and said position determining means determines the position of the location certification unit based on the messages from at least two sources.

19. A location certification unit as in claim 18 wherein the sources are beacons, and the location certification unit further comprises a transmitter for sending messages to a beacon that trigger the beacon into transmitting a response message that includes a time stamp, whereby it can be verified that the response message is a current message and not a copied message that is being replayed by comparing the time stamp with the sensor clock time at the time of receipt of the response message.

20. A location certification unit as in claim 18 further comprising a transmitter for sending a message to a beacon that triggers the beacon into transmitting a response message that includes a time stamp, whereby the total time for the sent message to travel to the beacon and the response message from the beacon to be sensed at the sensor, adjusted for by beacon delay and internal location certification unit delay, is divided in half and compared with the difference between the clock time at the time of receipt of the message and the time stamp to verify that the response message is valid.

*21. Apparatus for providing location certificates comprising*

*a location certification unit for receiving radio signals from two or more beacons,*

*said location certification unit including a position determinator and secure authenticator,*

*said secure authenticator including a private key of a private key-public key pair for digitally signing messages sent to a requesting source, a certificate for the public key certifying that the public key is in fact the public key of the secure authenticator, a receiver for receiving a time stamp transmitted by a beacon, and a processor for determining from the time stamp that a received radio signal is from a valid beacon,*

*said beacons providing radio signals from which said position determinator can compute its position and said secure authenticator can determine that the signals are valid, and*

*a transmitter for sending to said requesting source upon request a digitally signed message including the computed position of said location certificate unit and the certificate for the public key which public key is to be used by the requesting source to verify the signed message.*

*22. Apparatus as in claim 21 wherein said location certification unit is operable to establish a secure two-way communication link with said two or more beacons.*

*23. Apparatus as in claim 21 wherein said location certification unit is a component of a digital signature device.*

*24. Apparatus as in claim 21 wherein said location certification unit is a component of a satellite signal box.*

*25. A location certification unit comprising a position determination unit, a secure authorization unit coupled to said position determination unit, a memory within said secure authorization unit, a digital signature key stored in the form of digital data in said memory, said key having an associated public key, a certificate for said public key, a sensor for receiving a message from a beacon that includes the clock time at which the message was transmitted and for processing the message to retrieve the clock time, the sensor including a clock, said position determination unit computing from the retrieved clock time and the time of sensing a*

*received message as indicated by the sensor clock the radial distance the location certification unit is from the beacon thereby determining the location of the location certification unit as being within a geographical area centered on the beacon, and a transmitter for communicating to a requestor in response to a request the certified location of said location unit, said certified location comprising the location as determined by said position determining unit signed with said digital signature key and the certificate for said public key.*

*26. A location certification unit as in claim 25 wherein said memory further stores a personal identification number and a password and said location certification unit is a component of a computer log-on card.*

*27. A location certification unit as in claim 25 wherein the location certification unit is a component of a digital signature device.*

*28. A location certification unit as in claim 25 wherein the location certification unit is a component of a satellite signal decoder box.*

*29. A location certification unit as in claim 25 wherein the message from a beacon includes the digital signature of the clock time at which the message was transmitted, and said sensor has stored therein the public key of the beacon for verifying the clock time using the public key of the beacon.*

*30. A location certification unit comprising:*

*a position determination unit for determining the position of the location certification unit from received radio signals,*

*a secure authorization unit coupled to the position determination unit and comprising a memory, a sensor having a clock for providing clock time, and a transmitter for communicating to a requestor in response to a request a message containing the certified position of the location certification unit as determined by the position determination unit,*

*said memory having stored therein a digital signature key,*

*said clock providing a clock time for validating a received radio signal, the signal containing the time at which it was transmitted, sensed by the sensor as being from a valid source, and*

*said certified position of the location certification unit comprising (1) the position of the location certification unit as determined by the position determination unit signed using a digital signature key and (2) a certificate.*

*31. A location certification unit as in claim 30, said sensor further comprising a processor for processing sensed radio signals to provide the identity of the source of the signal where that information is contained in the signal, and for decrypting a sensed digitally signed radio signal with a public key of the source of the signal to verify the identity of the source and the time at which the signal was transmitted.*

*32. A location certification unit as in claim 30 wherein time differentials between the time the sensor clock marks a sensed signal and the time at which the signal was sent with respect to a plurality of sources are used to calculate the position of the location certification unit and each time differential is checked with the calculated signal transit time from the calculated position to the known location of the source.*

*33. A location certification unit as in claim 30 wherein said sensor is capable of receiving and processing signals received from more than one source and said position determining unit determines the position of the location certification unit based on the messages from at least two sources.*

*34. A location certification unit as in claim 33 wherein the sources are beacons, and the location certification unit further comprises a transmitter for sending messages to a beacon that trigger the beacon into transmitting a response message that includes a time stamp, whereby it can be verified that the response message is a current message and not a copied message that is being replayed by comparing the time stamp with the sensor clock time at the time or receipt of the response message.*

*35. A location certification unit as in claim 33 further comprising a transmitter for sending a message to a beacon that triggers the beacon into transmitting a response message that includes a time stamp, whereby the total time for the sent message to travel to the beacon and the response message from the beacon to be sensed at the sensor, adjusted for by beacon delay and internal location certification unit delay, is divided in half and compared with the difference between the clock time at the time of receipt of the message and the time stamp to verify that the response message is valid.*

* * * * *